US008782866B2

(12) United States Patent
Anderson, III et al.

(10) Patent No.: US 8,782,866 B2
(45) Date of Patent: Jul. 22, 2014

(54) ANGULARLY ADJUSTABLE CLAMP ASSEMBLY

(75) Inventors: James H. Anderson, III, York, PA (US); Adam Lehigh, Spring Grove, PA (US)

(73) Assignee: Coupling Corporation of America, Inc., Jacobus, PA (US)

( * ) Notice: Subject to any disclaimer, the term of this patent is extended or adjusted under 35 U.S.C. 154(b) by 474 days.

(21) Appl. No.: 13/110,296

(22) Filed: May 18, 2011

(65) Prior Publication Data

US 2012/0294673 A1    Nov. 22, 2012

(51) Int. Cl.
*B25G 3/20* (2006.01)

(52) U.S. Cl.
USPC ........................................................ 29/407.1

(58) Field of Classification Search
USPC ................ 403/84, 300, 305, 306, 337, 374.4; 285/323, 343, 368; 29/407.1
See application file for complete search history.

(56) References Cited

U.S. PATENT DOCUMENTS

| | | | |
|---|---|---|---|
| 369,136 A | | 8/1887 | Stuart |
| 816,155 A | * | 3/1906 | Dean .......................... 285/334.4 |
| 960,899 A | * | 6/1910 | Guyer ............................ 285/181 |
| 1,498,855 A | * | 6/1924 | Parker ........................... 285/412 |
| 2,216,481 A | * | 10/1940 | Wolferz ......................... 285/343 |
| 3,752,509 A | * | 8/1973 | Stafford ...................... 285/334.4 |
| 4,070,046 A | * | 1/1978 | Felker et al. ................... 285/337 |
| 4,109,945 A | * | 8/1978 | Manchester et al. ........... 285/323 |
| 4,138,147 A | * | 2/1979 | Manchester et al. ........ 285/145.1 |
| 4,240,655 A | * | 12/1980 | Rascher et al. ................ 285/323 |
| 4,290,632 A | * | 9/1981 | Manchester et al. ........... 285/323 |
| 4,330,143 A | * | 5/1982 | Reneau .......................... 285/322 |
| 4,403,795 A | * | 9/1983 | Davlin ........................... 285/184 |
| 4,407,603 A | * | 10/1983 | Lundgren ....................... 403/370 |
| 4,411,551 A | | 10/1983 | Adelbratt |
| 4,428,603 A | * | 1/1984 | Davlin ........................... 285/368 |
| 4,460,289 A | | 7/1984 | Lundgren |
| 4,461,592 A | | 7/1984 | Adelbratt |
| 4,464,140 A | | 8/1984 | Lundgren |
| 4,525,916 A | | 7/1985 | Wuhrer |
| 4,613,160 A | * | 9/1986 | Reneau ............................ 285/18 |

(Continued)

OTHER PUBLICATIONS

Coupling Corporation of America, Vertical Clamp Coupling, Brochure, Feb. 2007, Coupling Corporation of America, Jacobus, Pennsylvania.

(Continued)

*Primary Examiner* — Daniel P Stodola
*Assistant Examiner* — Daniel Wiley
(74) *Attorney, Agent, or Firm* — McNees Wallace & Nurick LLC

(57) ABSTRACT

An angularly adjustable clamp assembly includes a hub clamp, an adjustment base connectable to the hub clamp and a plurality of attachment members. The hub clamp includes a hub and collar, the hub having a sleeve portion forming a passageway to receive a shaft. The sleeve portion has multiple slits along the sleeve portion to form a plurality of sleeve segments. The collar has an inner surface configured to engage an outer surface of the sleeve portion. The attachment members cause the collar to move axially along the length of the sleeve portion to urge the sleeve segments radially inward to secure the shaft within the passageway. The assembly is configured such that at least one attachment member further connects the adjustment base to the hub clamp. The attachment members can be actuated to cause an angular adjustment of two shafts connected by the assembly.

3 Claims, 10 Drawing Sheets

(56) References Cited

U.S. PATENT DOCUMENTS

| | | | |
|---|---|---|---|
| 4,618,170 A * | 10/1986 | Fishburne | 285/90 |
| 4,711,426 A * | 12/1987 | Bodnar | 251/151 |
| 4,781,486 A | 11/1988 | Mochizuki | |
| 4,832,379 A * | 5/1989 | Smith et al. | 285/323 |
| 4,840,410 A * | 6/1989 | Welkey | 285/261 |
| 4,878,698 A * | 11/1989 | Gilchrist | 285/342 |
| 5,123,772 A | 6/1992 | Anderson | |
| 5,421,623 A | 6/1995 | Cassin | |
| 5,806,833 A * | 9/1998 | Riibe | 251/305 |
| 6,036,451 A | 3/2000 | Badger et al. | |
| 6,234,910 B1 | 5/2001 | Norberg | |
| 6,375,383 B1 * | 4/2002 | Ostling et al. | 403/374.3 |
| 6,446,541 B1 * | 9/2002 | Eriksson | 92/140 |
| 6,729,660 B2 * | 5/2004 | Musser | 285/412 |
| 6,736,027 B2 * | 5/2004 | Ostling et al. | 74/578 |
| 7,490,868 B2 * | 2/2009 | Prestridge | 285/368 |
| 8,490,706 B2 * | 7/2013 | Rodgers | 166/379 |
| 2004/0036293 A1 * | 2/2004 | Flindall | 285/412 |
| 2008/0136183 A1 * | 6/2008 | Stangeland et al. | 285/412 |

OTHER PUBLICATIONS

Coupling Corporation of America, Anderson Clamp Hub, Brochure, 2005, Coupling Corporation of America, Jacobus, Pennsylvania.

* cited by examiner

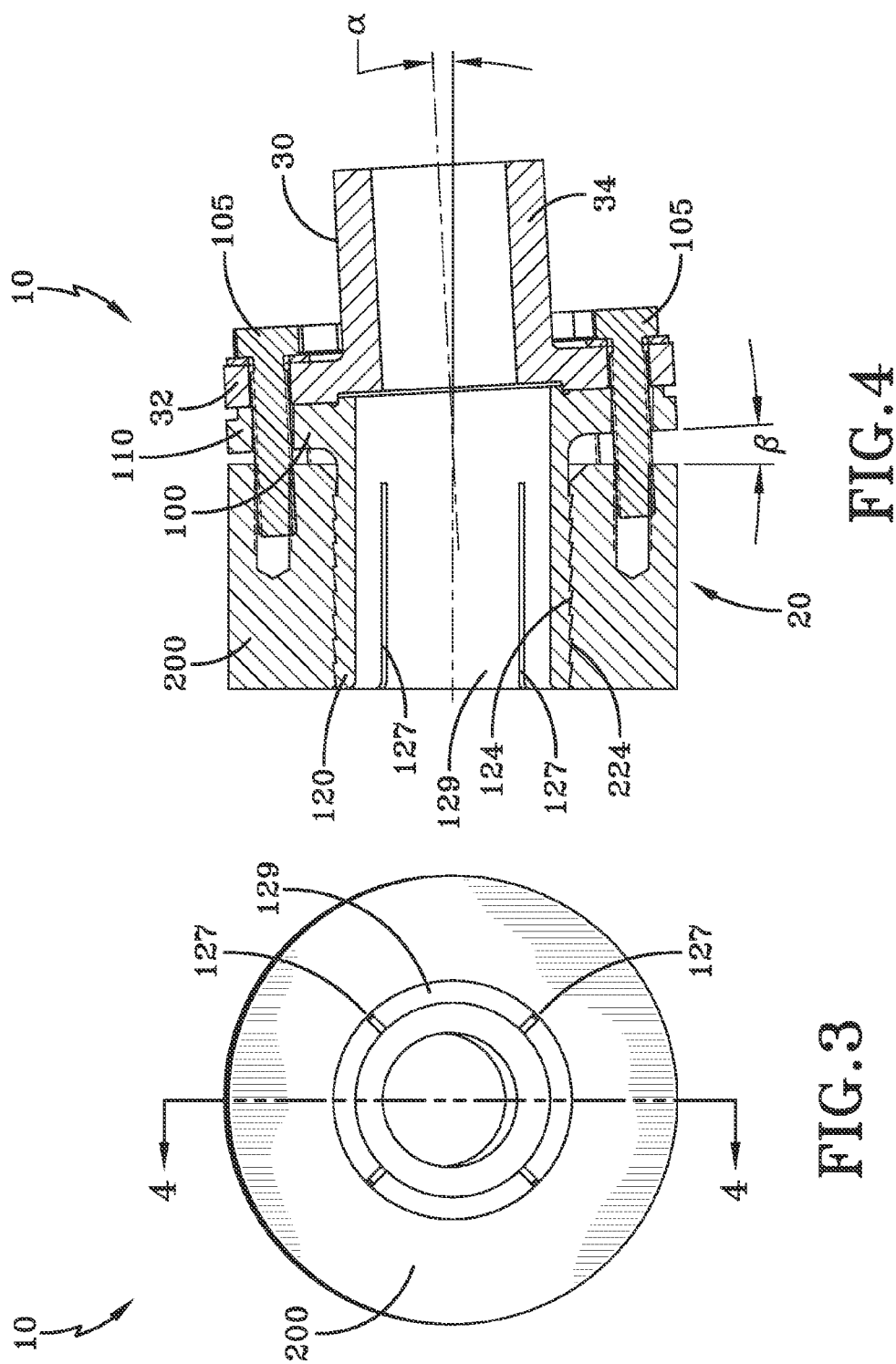

ANGULARLY ADJUSTABLE CLAMP ASSEMBLY

FIELD OF THE INVENTION

The present invention is directed to a coupling and more particularly to an angularly adjustable clamp assembly for use in the transfer of torque between two shafts.

BACKGROUND OF THE INVENTION

It is common for a motor be used to drive a shaft, which transfers torque from the motor to be used as mechanical energy for driving a pump, ship propeller or any number of other applications. In some cases, the torque must be carried over long distances that exceed the length of a single shaft attached to the motor and one or more additional shafts are required to connect the motor to the ultimate device to which the mechanical energy is being transferred.

Mechanical wear of a pump or other mechanical device can in some cases be lessened when the shaft is properly aligned with the device's bearings. In horizontal arrangements, this often can be achieved through the use of flexible couplings. In vertical applications, however, flexible couplings cannot be used because current flexible couplings are unable to support the weight of the pump or other device at the end of the shaft and rigid couplings are used instead.

Although rigid couplings are better able to support the weight of a vertically positioned pump and its associated shaft(s), such couplings are less able to respond to situations in which adjustments in the alignment between the motor shaft and the device shaft are needed. Current solutions generally involve a trial and error approach of making incremental permanent deformations of the rigid couplings to achieve proper alignment. However, this approach also requires that the coupling assembly be disassembled, modified, reassembled and then analyzed to determine whether the adjustment sufficiently resolved the alignment problem. These efforts can be laborious and time consuming, particularly in down-well applications in which the pump or other device at the bottom of the well, along with any additional shaft extension segments, must be pulled from the well and subsequently dropped back down as part of each adjustment.

These and other drawbacks are associated with coupling two shafts for the transfer of torque.

What is needed is a clamp assembly that can be used to couple two shafts for the transfer of torque that allows angular adjustments to more easily be made after the clamp assembly has been installed.

SUMMARY OF THE INVENTION

According to an exemplary embodiment of the invention, an angularly adjustable clamp assembly comprises a hub clamp, an adjustment base connectable to the hub clamp and a plurality of attachment members. The hub clamp comprises a hub and a collar; the hub includes an annular sleeve portion having a plurality of substantially longitudinal slits therein extending from a distal end of the sleeve portion toward a proximal end of the sleeve portion to form a plurality of sleeve segments and the hub defines a passageway therethrough. The collar has an inner surface configured to engage an outer surface of the sleeve portion. The attachment members are arranged and disposed to cause the collar to move axially along the length of the sleeve portion of the hub and thereby urge the sleeve segments radially inward such that the sleeve segments apply a clamping force to secure a shaft within the passageway. The assembly is configured such that at least one attachment member further connects the adjustment base to the hub clamp.

According to another exemplary embodiment of the invention, a method for adjusting the alignment of two shafts is provided. The method includes providing the described assembly, inserting a first shaft through the passageway, engaging the attachment members to secure the first shaft in the passageway, connecting the hub clamp to the adjustment base, attaching a second shaft to the adjustment base and further engaging less than all of the attachment members after the first shaft has been secured in the passageway sufficient to cause a deformation of the adjustment base such that the angular alignment of the second shaft is modified with respect to the first shaft.

An advantage of exemplary embodiments is that the alignment of two shafts can be adjusted in an installed position, without the need to engage in serial disassembly and reassembly of the coupling.

Another advantage is that clamp assemblies in accordance with exemplary embodiments provide an angularly adjustable assembly that can bear the weight of a vertically disposed device connected to a shaft while adjustments to the assembly are being made.

Still another advantage is that clamp assemblies in accordance with exemplary embodiments are particularly useful in applications in which two shafts are to be oriented vertically during operation, such as line shaft and vertical pump applications.

Other features and advantages of the present invention will be apparent from the following more detailed description of exemplary embodiments, taken in conjunction with the accompanying drawings which illustrate, by way of example, the principles of the invention.

BRIEF DESCRIPTION OF THE DRAWINGS

FIG. 3 illustrates a front view of the assembly of FIG. 1.

FIG. 4 illustrates a cross-sectional view taken along line 4-4 of FIG. 3.

Where like parts appear in more than one drawing, it has been attempted to use like reference numerals for clarity.

DETAILED DESCRIPTION OF EXEMPLARY EMBODIMENTS

Figure 1B:
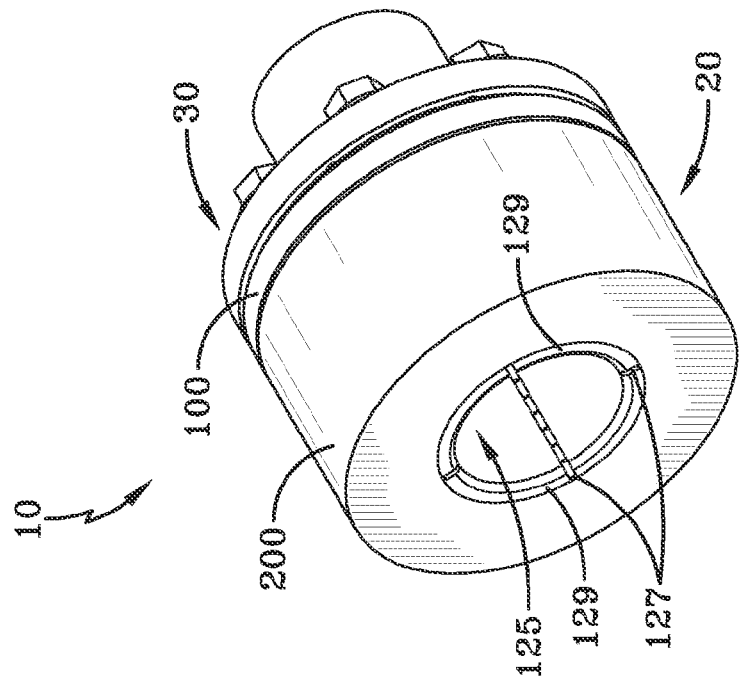
FIGS. 1A and 1B illustrate front and rear perspective views of a clamp assembly in accordance with an exemplary embodiment.
Figure 1A:
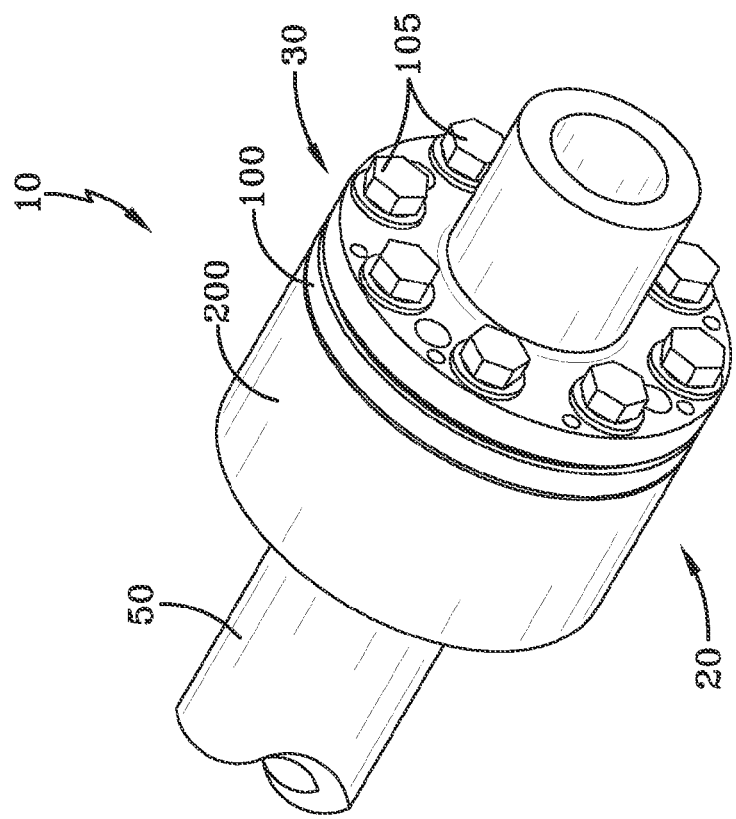

Turning to FIGS. 1A and 1B, an angularly adjustable clamp assembly 10 is illustrated in accordance with an exemplary embodiment having a hub clamp 20 that comprises a hub 100 and a collar 200. The assembly 10 also includes an adjustment base 30 that attaches to the hub clamp 20. The hub clamp 20 secures a first shaft 50 (FIG. 1A) such that the assembly can be used to transfer torque from the first shaft 50 to a second shaft (not shown) that is directly or indirectly attached to the adjustment base 30. Typically, but not necessarily, the first shaft 50 constitutes a driving end, being connected to a motor or other similar device, while the second shaft constitutes a driven end, being directly connected to a pump, machine or other device or being indirectly connected to such devices via one or more intermediate shafts.

Figure 2:
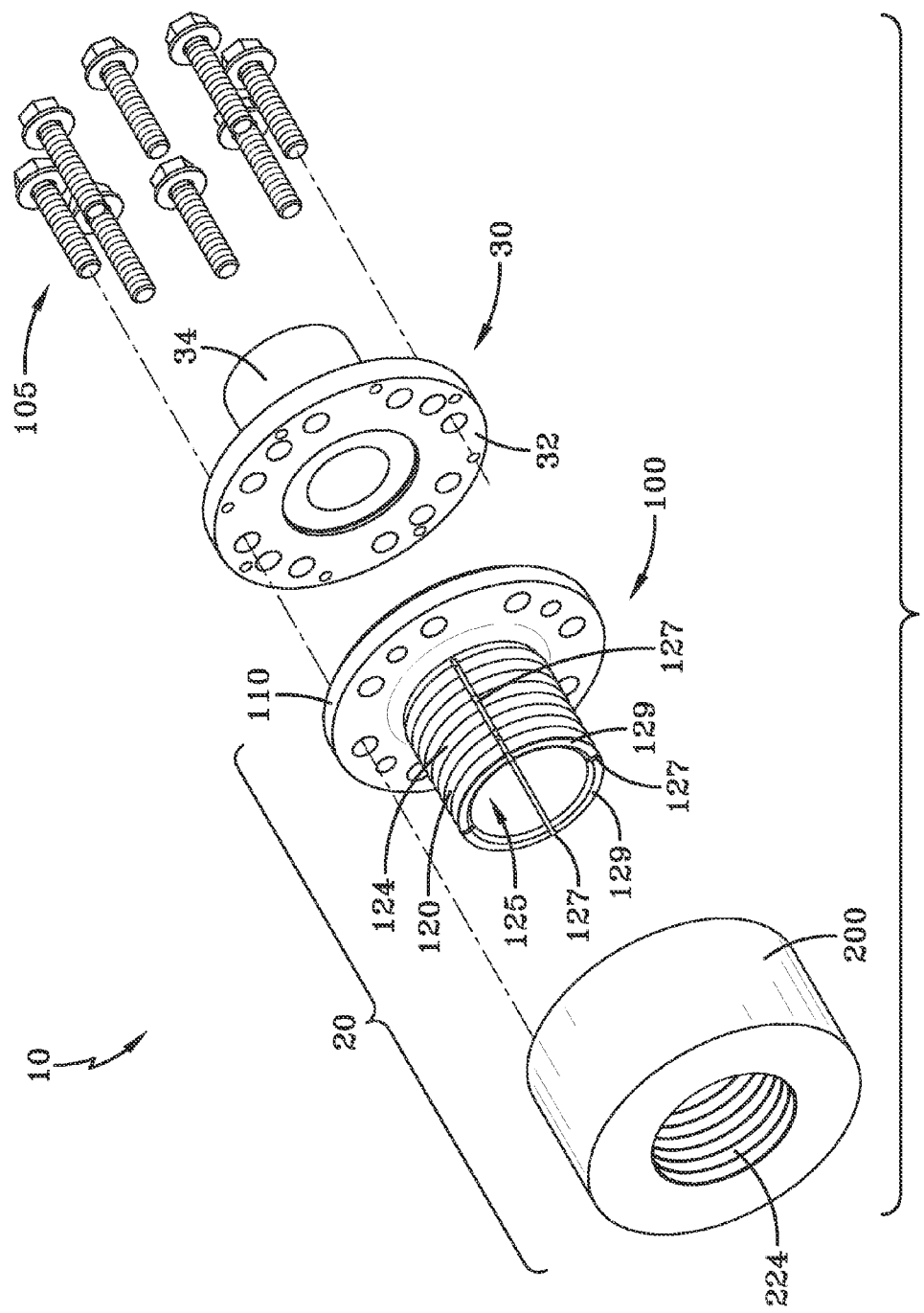
FIG. 2 illustrates an exploded perspective view of the clamp assembly of FIG. 1.

As better seen in FIG. 2, which illustrates an exploded, unassembled view of the assembly 10 in which the first shaft 50 is omitted for clarity, the hub clamp 20 has a hub 100 that includes a flange portion 110 and an annular sleeve portion 120 that extends away from the flange portion 110. A passageway 125 extends through the hub 100 into which the first shaft 50 is inserted and secured within the hub clamp 20.

The interior surface of the hub 100 that defines the passageway 125 is preferably unthreaded to be able to receive smooth shafts. As a result, expensive machining associated with obtaining or creating threaded shafts can be avoided, although surface features, coatings and other friction enhancements may be provided in the surface defining the passageway 125. It will be appreciated, however, that threaded shafts and/or a threaded passageway are not precluded and will still be secured by the hub clamp 20. Exemplary embodiments include keyless constructions that do not require the use of a keyed shaft or a keyed hub. As a result, neither the shafts nor the hub are required to have any particular relative orientation to one another during assembly.

The annular sleeve portion 120 of the hub 100 has a plurality of substantially longitudinal slits 127 extending from the distal end of the sleeve portion 120 toward the proximal end of the sleeve portion 120 adjacent the flange portion 110. The longitudinal slits 127 may be linear, or non-linear, such as helical. The arrangement of slits 127 results in the formation of a plurality of sleeve segments 129 in the sleeve portion 120. The slits 127 permit inward radial movement of the sleeve segments 129 against the first shaft 50 in the passageway 125 to secure it therein.

The sleeve portion 120 has an outer surface that may include surface features configured to engage a corresponding set of surface features of the collar 200. In one embodiment, the surface features are grooves, such as symmetric or asymmetric grooves. In one embodiment, the grooves are in the form of threads, typically in the form of buttress threads.

The collar 200 has surface features on an inner surface that correspond to the surface features of the outer surface of the sleeve portion 120 of the hub 100. As illustrated in FIG. 2 and better seen in FIG. 4, the corresponding set of surface features are shown as threaded, asymmetric grooves 124, 224. Where the grooves 124, 224 are threaded, the collar 200 can be screwed onto, and thereby engage, the sleeve portion 120.

The first shaft 50 may be inserted into the passageway 125 either before or after the collar 200 is engaged with the sleeve portion 120. After the first shaft 50 has been inserted within the passageway 125 and the collar 200 has been positioned over the sleeve portion 120 of the hub 100, the hub clamp 20 can be moved to its operative position to secure the first shaft 50 within the passageway 125. This operative position occurs by urging the collar 200 to move axially with respect to the hub 100 along the sleeve portion 120 in a linear manner. The axial movement of the collar 200 urges the sleeve segments 129 radially inward toward each other, resulting in a reduction in cross-sectional area defined by the inner surfaces of the sleeve segments 129 forming passageway 125 and thereby exerting a clamping force on the first shaft 50 positioned in the passageway 125.

Referring to FIGS. 3 and 4, the corresponding engaged asymmetric grooves 124, 224 of the outer surface of the sleeve segments 129 and the inner surface of the collar 200 permit a limited amount of axial travel of the collar 200 with respect to the sleeve portion 120. The pitch of the grooves 124, 224 is such that the amount of axial travel is sufficient to achieve a sufficient corresponding inward radial movement of the sleeve segments 129 to exert the necessary clamping force, but without the engaged surface features slipping past one another to an adjacent mating feature that could prevent effective clamping.

Figure 9:
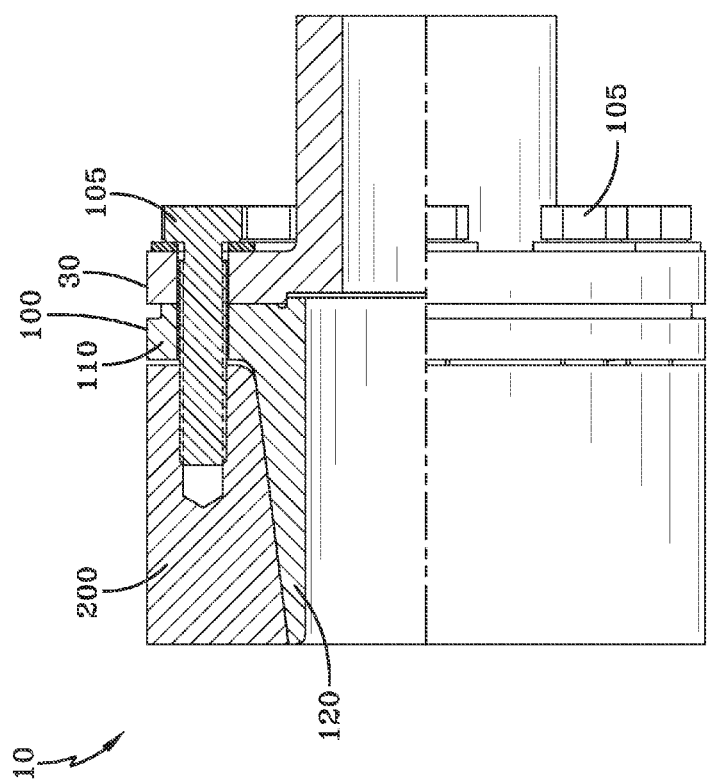
FIG. 9 illustrates a partial cross sectional view showing the mating surfaces of the collar and sleeve portion of a clamp assembly in accordance with an exemplary embodiment after assembly.

In another embodiment, the outer surface of the sleeve portion 120 and the inner surface of the collar 200 engage one another despite being generally smooth, the surfaces beveled with respect to one another to form extended opposing inclined planes, as better seen in FIG. 9. Any other configuration can also be used that permits relative axial motion between the collar 200 and hub 100 to cause radially inward movement of the sleeve segments 129 in order to exert a clamping force on the first shaft 50.

As illustrated, one manner in which the collar 200 may be moved axially with respect to the hub 100 and cause the sleeve segments 129 to exert a clamping force on the shaft is through a plurality of threaded members, illustrated as bolts 105, or other attachment members distributed about the circumference of the flange portion 110 that engage a threaded counterbore formed in the collar 200. As the bolts 105 are tightened, they draw the collar 200 axially toward the flange portion 110.

Although shown and described with respect to bolts 105 as the attachment members, it will be appreciated that any method of exerting a force may be employed that results in an axial movement of the collar 200 with respect to the hub 100 and thereby reduces the effective diameter of the passageway 125 to secure the first shaft 50 therein.

According to exemplary embodiments, at least one of the attachment members, here the bolts 105, is also used to attach the adjustment base 30 to the hub clamp 20. As best illustrated in FIGS. 2 and 4, the bolts 105 are inserted through apertures formed in a flange 32 of the adjustment base 30 and through apertures formed in the flange portion 110 of the hub 100 to ultimately be received in counterbores formed in the collar 200. The apertures in the adjustment base flange 32 and/or the flange portion 110 of the hub 100 may be threaded or unthreaded.

Tightening the bolts 105 has the effect of causing the collar 200 to travel axially along the sleeve portion 120 toward the flange portion 110 of the hub 100, causing the sleeve segments 129 to converge toward the passageway 125 and thereby secure the first shaft 50 therein. By continuing to tighten less than all of the bolts 105 after the shaft has been secured, an imbalance of force is created that can cause the adjustment base 30 and/or the flange portion 110 of the hub 100 to flex and become slightly deformed.

This deformation causes an angular displacement of the adjustment base 30 and/or the hub flange portion 110 to be deflected by an angle β (shown exaggerated in FIG. 4 for purposes of illustration). As a result, the alignment of the first shaft 50 with respect to the adjustment base 30 and, therefore, with respect to the second shaft is achieved, the alignment being angularly adjusted by an angle α (shown exaggerated in FIG. 4 for purposes of illustration). The amount and direction of deformation, and thus the change in angular alignment, can be modified by the location and number of bolts 105 tightened and by the amount of additional torque applied to the bolts 105, as well as the thickness and material of construction of the flange portion 110 of the hub 100 and/or the adjustment base 30. It will further be appreciated that the nature of the deformation is such that the angle β is not necessarily radially uniform in achieving the desired angular adjustment.

Applications in which angularly adjustable clamp assemblies in accordance with exemplary embodiments are particularly useful are those in which the shafts are oriented vertically, such as in line shaft and down-well pump applications. Such angular adjustments can result in the second shaft and the driven end being positioned such that the second shaft is better aligned with the bearings of the attached device at the driven end. In some cases, exemplary embodiments can be used to reduce variations in vertical alignment from 10 to 20 mils or greater to 5 mils or less. Even modest reductions can have significant effects over the lifetime of a pump or other device at the driven end. In vertical applications, exemplary embodiments have the further advantage that the use of threaded members supports the weight of the connection, so that in-place adjustments can be made.

Furthermore, the manner in which the adjustment is made can be carried out in a way that is a continuation of the installation process. Thus, the weight of the driven end is supported by the collar 200, which cannot be achieved with conventional flexible couplings. Further, fine adjustments can be made in place without the need to remove, adjust, and replace the driven end in a more time consuming, incremental trial-and-error process.

As shown in FIGS. 1-4, the adjustment base 30 acts as a spacer and includes a flange 32 from which a spacer portion 34 extends. The adjustment base 30 can be connected to the second shaft in any suitable manner, using any suitable clamp. The spacer portion 34 provides separation between the first and second shafts that may be useful to provide room for manipulation of tools during installation and service.

Figure 5:
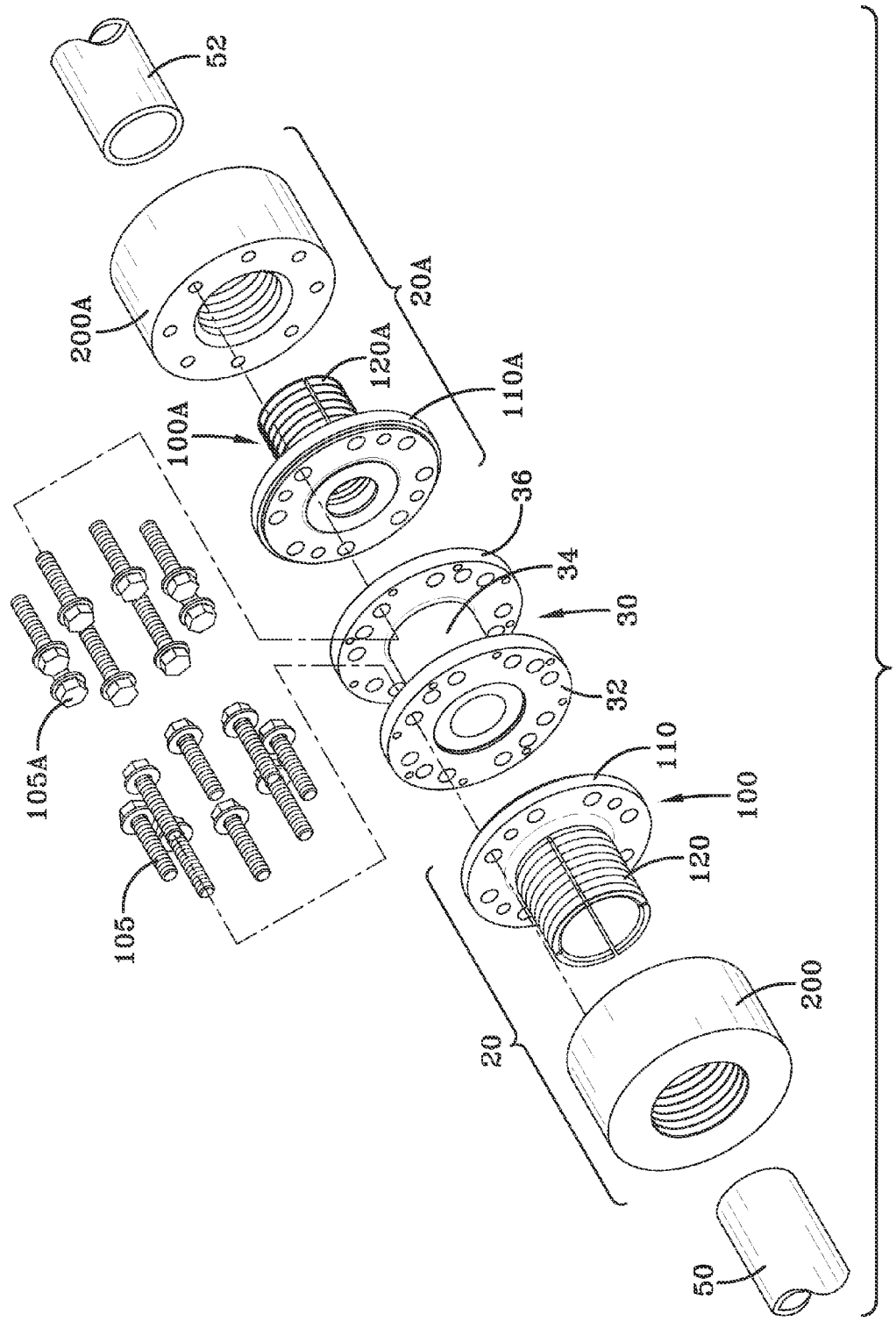
FIG. 5 illustrates an exploded perspective view of a clamp assembly in accordance with another exemplary embodiment.

In one embodiment, illustrated in FIG. 5, the adjustment base 30 includes two flanges 32, 36 disposed at opposing ends of the adjustment base 30 and connected by the spacer portion 34. This embodiment may be useful in which a second hub clamp 20A is provided and used to attach the second shaft 52 to the adjustment base 30, with the first shaft 50 being connected to the hub clamp 20. The second hub clamp 20A can be any suitable hub clamp. In one embodiment, as illustrated, the second hub clamp 20A may be identical to and operate in the same manner as already described, having a hub 100A (including a flange 110A and sleeve 120A) and collar 200A, in which bolts 105A are used to both secure the second shaft in the second hub clamp 20A and secure the second hub clamp 20A to the adjustment base 30.

Figure 6:
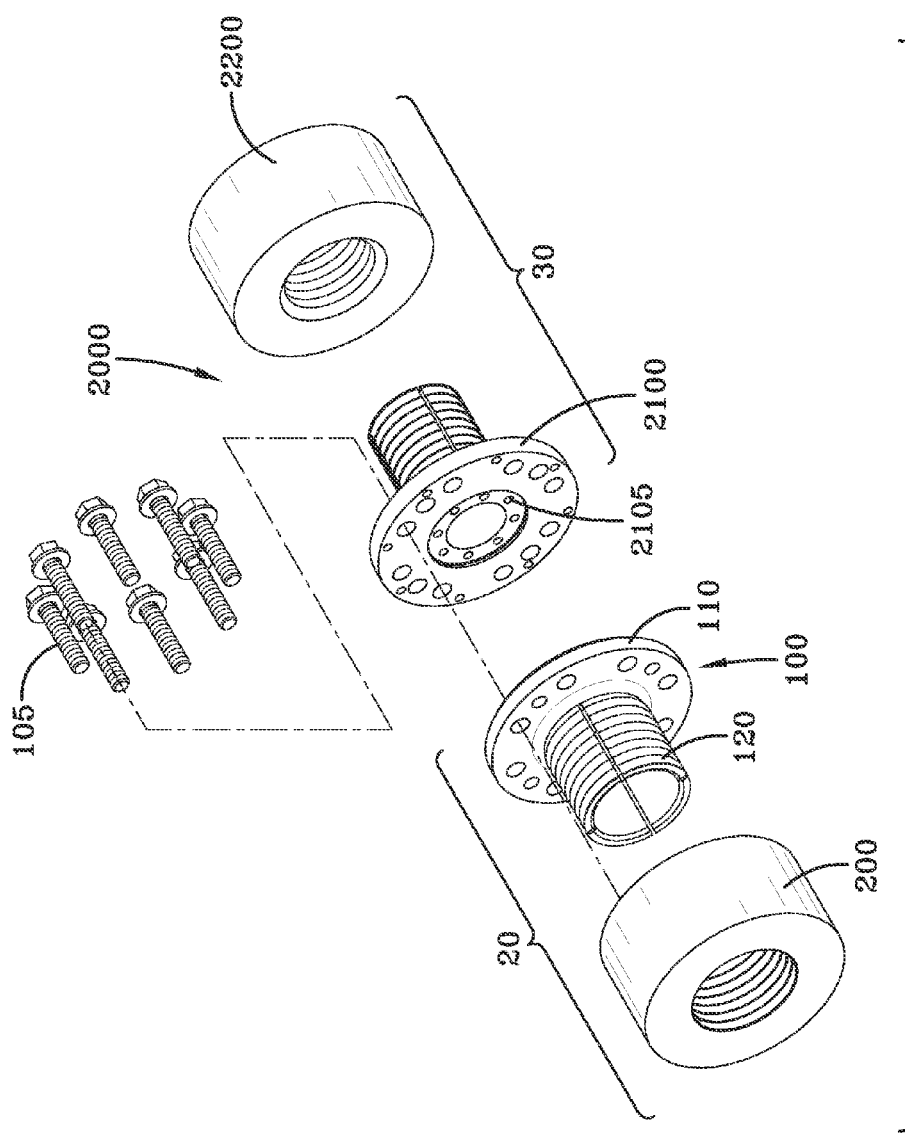
FIG. 6 illustrates an exploded perspective view of a clamp assembly in accordance with yet another exemplary embodiment.
Figure 7:
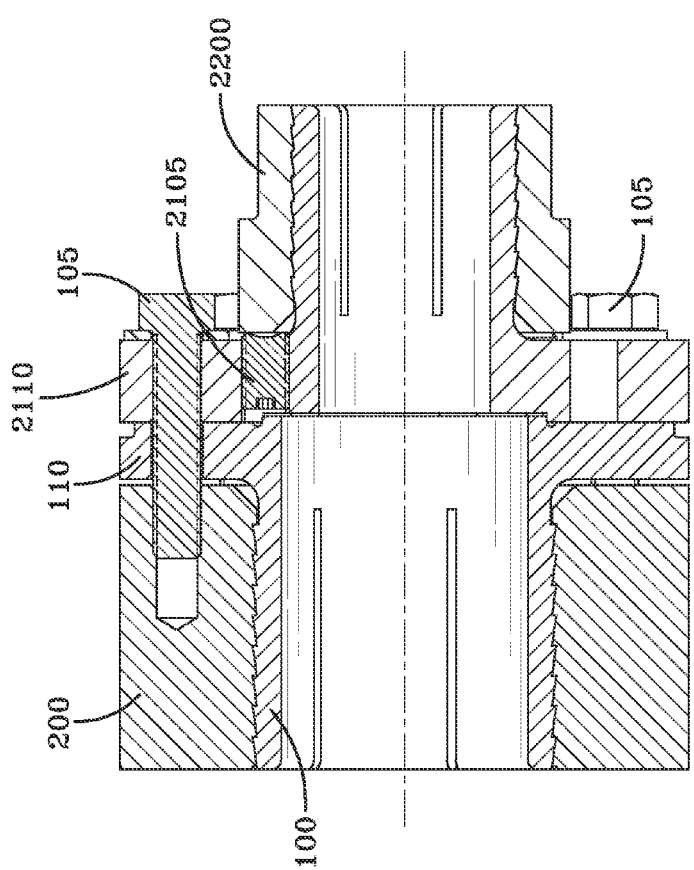
FIG. 7 illustrates a cross sectional view of the embodiment shown in FIG. 6 after assembly.

In another embodiment, as shown in FIGS. 6 and 7, the adjustment base is itself a hub clamp 2000 in which the second shaft is secured. In this embodiment, bolts 105 may be passed through apertures formed in the periphery of a flange portion 2110 of the hub 2100 of the second hub clamp 2000, to secure it to the hub clamp 20 to form the angularly adjustable clamp assembly 10. The second shaft may be secured in the second hub clamp 2000 separate from the bolts 105 used to secure the second hub clamp 2000 as the adjustment base for the hub clamp 20.

As shown in this embodiment, the hub clamp 2000 that comprises the adjustment base may include a plurality of set screws 2105 that push the collar 2200 axially away from the flange 2100. In this embodiment, the asymmetric grooves are oriented in the opposite direction such that the inclined planes accommodate the pushing, rather than the pulling, force applied by the set screws 2105. The use of set screws 2105 can permit the fasteners to more easily be flush with or recessed from the hub flange 2100, increasing the surface area in contact with the hub clamp 20 in order to more easily apply a deformation force that achieves the desired level of angular adjustment when the bolts 105 are tightened.

FIG. 7 illustrates that the diameter of the collar 2200 of the hub clamp 2000 that comprises the adjustment base may be decreased to accommodate access to the bolts 105 for attaching to the hub clamp 20. FIG. 7 also illustrates that exemplary embodiments may be used to connect two shafts of different size.

Figure 8:
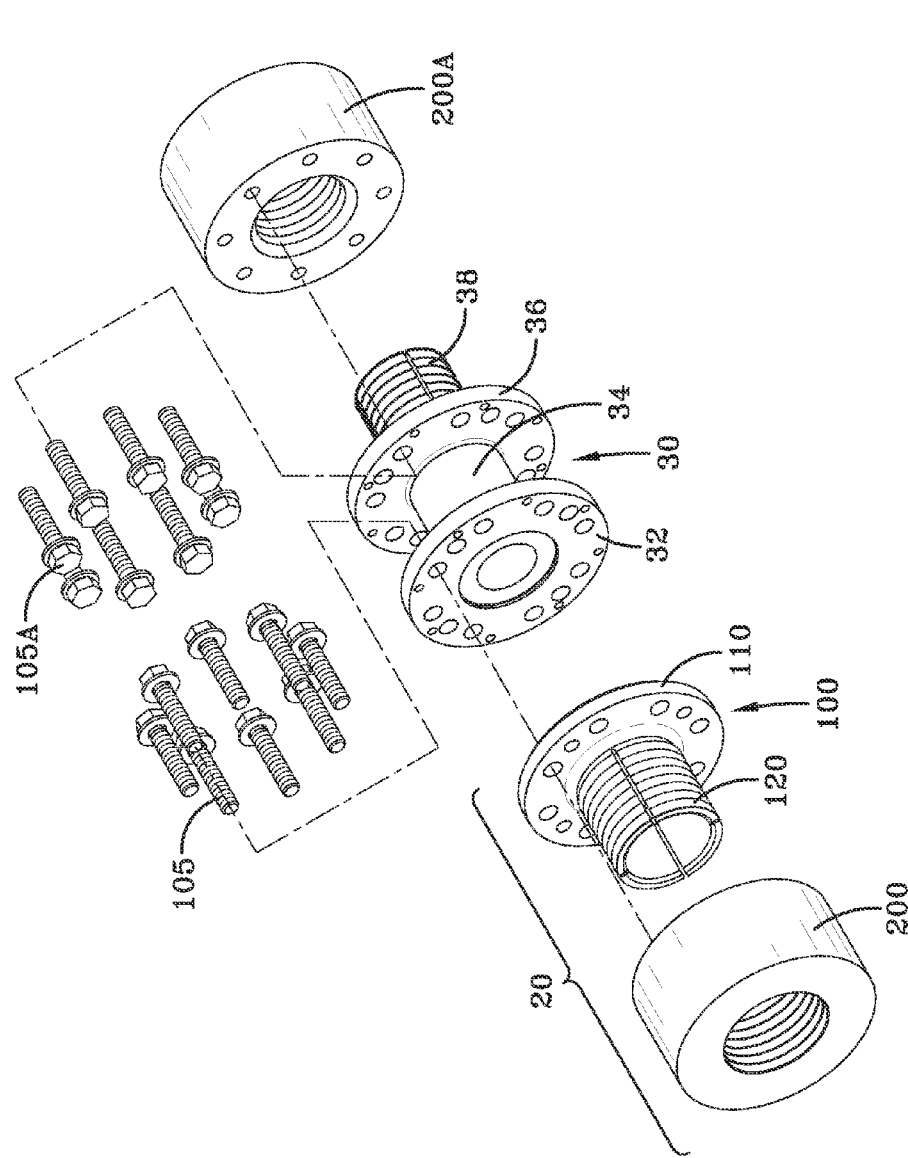
FIG. 8 illustrates an exploded perspective view of a clamp assembly in accordance with still another exemplary embodiment.

An alternative embodiment is illustrated in FIG. 8 that represents a variation on the embodiments of FIGS. 5 and 6 in which a sleeve portion 38 is formed integral with the adjustment base 30 extending away from the second adjustment base flange 36 in a direction opposite the spacer portion 34. A first set of bolts 105 attaches the hub clamp 20 to the adjustment base 30 in the manner previously described, while a second set of bolts 105A inserted through the second adjustment base flange 36 attaches to and draws a collar 200A toward that flange, causing sleeve segments of the adjustment base's integral sleeve portion 38 to move radially inward to secure a second shaft therein.

Figure 10:
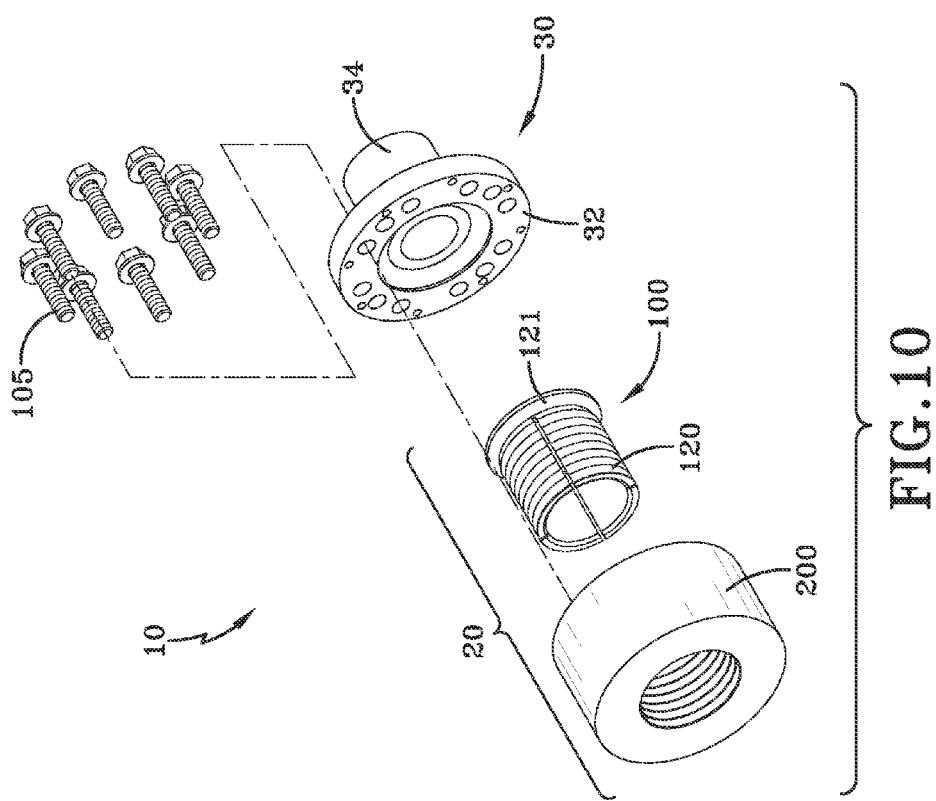
FIG. 10 illustrates an exploded perspective view of a clamp assembly in accordance with an exemplary embodiment.
Figure 11:
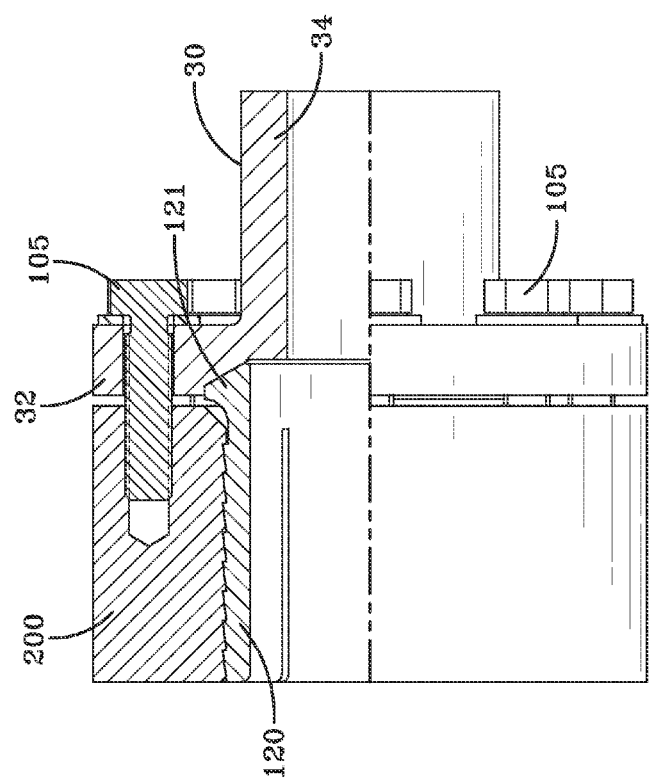
FIG. 11 illustrates a partial cross sectional view of the clamp assembly shown in FIG. 10 after assembly.

According to yet another embodiment shown in FIGS. 10 and 11, a hub clamp assembly 10 is shown in which the hub 100 includes a sleeve portion 120, but not a flange portion 110. In this embodiment, the bolts extend to connect the adjustment base 30 to the hub clamp 20 by extending directly into the collar 200. The sleeve portion 120 may include a lip 121 to slightly increase the surface area in contact with the adjustment base 30 without the additional mass of a flange through which the bolts 105 extend. The adjustment base flange 32 may include a recess to receive the sleeve portion 120. The exclusion of a flange from the hub 100 may result in a lesser application of force needed to achieve a desired angular displacement with respect to the shafts that the assembly 10 connects.

Angularly adjustable clamp assemblies in accordance with exemplary embodiments may be used in applications in which they are subjected to demanding conditions, and are ordinarily used in vertical applications, which can put additional strain on the assembly 10 to support the weight of the device being driven. The angularly adjustable clamp assembly 10 may be constructed of a robust material, such as a 4000 series alloy steel or 17-4 stainless steel, by way of example only. In some embodiments, such as where the angularly adjustable clamp assembly 10 will be operated in corrosive environments, it may be desirable for the assembly 10 to be constructed of or plated with stainless steel, platinum or other corrosion resistant material. It will be appreciated, however, that the angularly adjustable clamp assembly 10 can be manufactured of any suitable material and that in addition to the environment of operation, the material selected may also depend on the material of construction of the shafts being connected, as well as the torque to be transferred and under which the angularly adjustable clamp assembly 10 will operate.

In addition to the possibility of exposure to high temperatures, angularly adjustable clamp assemblies in accordance with exemplary embodiments may be attached to shafts turning at many thousands of rotations per minute and transferring torque as high as 50 million foot pounds or more. Thus, the hub 100, collar 200, and adjustment base 30 are typically cylindrical and concentric to achieve balance when the assembly 10 is in operation and turning about its axis.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of adjusting the alignment of two shafts comprising:
   providing a first assembly, the first assembly comprising:
   a hub clamp, the hub clamp comprising:
   a hub, the hub including a hub flange portion, and an annular sleeve portion extending from the hub flange portion, the sleeve portion having a plurality of substantially longitudinal slits therein extending from a distal end of the sleeve portion toward the hub flange portion to form a plurality of sleeve segments, an inner surface of the sleeve portion defining a passageway therethrough, and an outer surface of the sleeve portion comprising an axially tapered clamping surface, and
   an annular collar, the collar defining an inner surface having an axially tapered clamping surface corresponding to that of the sleeve portion;
   an adjustment base, the adjustment base comprising:
   a first base flange portion;
   a second base flange portion; and
   a spacer portion extending between the first and second base flange portions; and
   a plurality of first threaded attachment members passing through the first base flange portion, through holes in the hub flange portion, and engaging with the collar;
   inserting a first shaft through the passageway, the first shaft defining a first longitudinal axis;
   engaging at least some of the first threaded attachment members to move the collar axially with respect to the hub flange portion, thereby moving the tapered clamping surfaces of the hub against the tapered clamping surface of the collar so as to urge the sleeve segments axially inward to secure the first shaft in the passageway;
   providing a second assembly substantially identical to the first assembly, wherein a plurality of second threaded attachment members pass through the second base flange portion and engage with a second collar;
   attaching a second shaft to the second base flange portion of the adjustment base using the second assembly in the same manner as the first assembly, the second shaft defining a second longitudinal axis; and
   further engaging less than all of the second threaded attachment members so as to cause increased displacement of the tapered clamping surfaces around one portion of the periphery of the collar and hub such that the second longitudinal axis of the second shaft is moved out of alignment with respect to the first longitudinal axis of the first shaft.

2. The method of claim 1, wherein each of the first and second shafts are oriented vertically.

3. The method of claim 1, wherein the axially tapered clamping surfaces of the sleeve portion and the collar comprise buttress threads.

* * * * *